Jan. 26, 1943.   B. R. BENJAMIN   2,309,158
AGRICULTURAL IMPLEMENT
Filed Jan. 13, 1941   5 Sheets-Sheet 3

Inventor
Bert R. Benjamin
By Paul O Pippel
Atty.

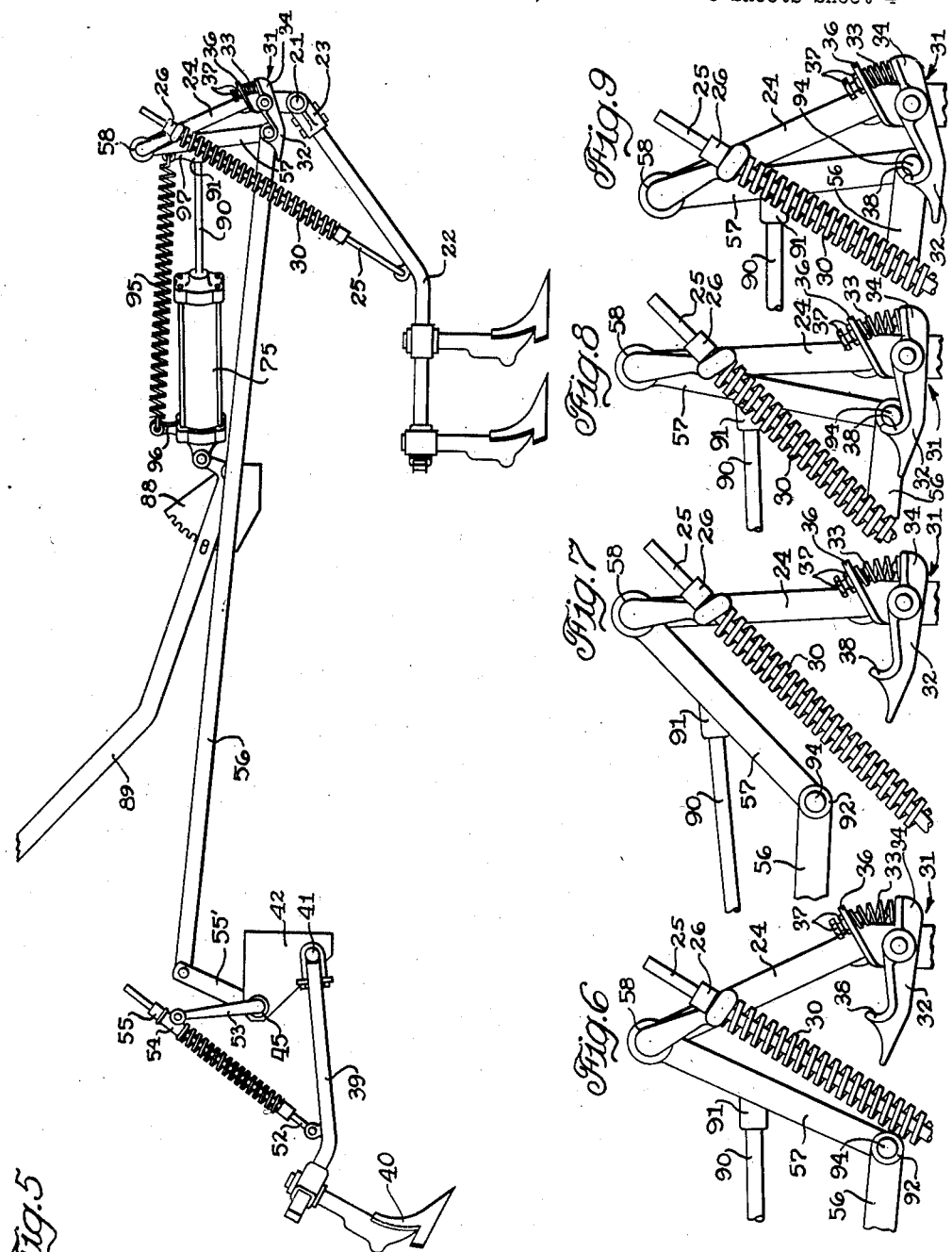

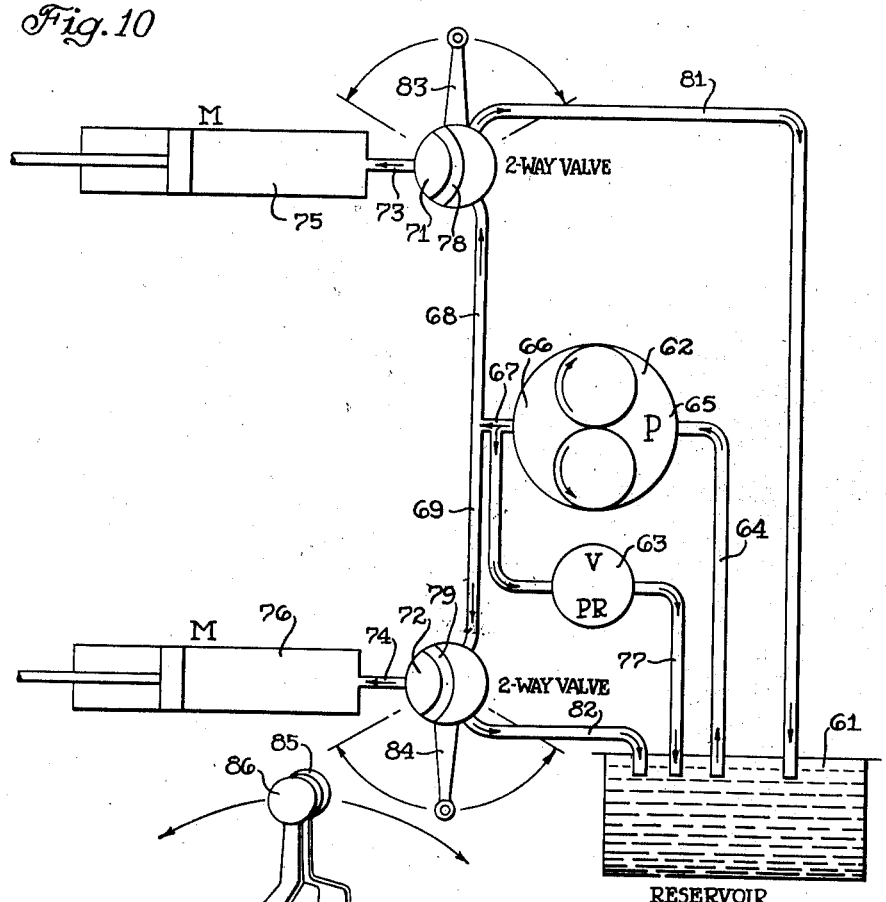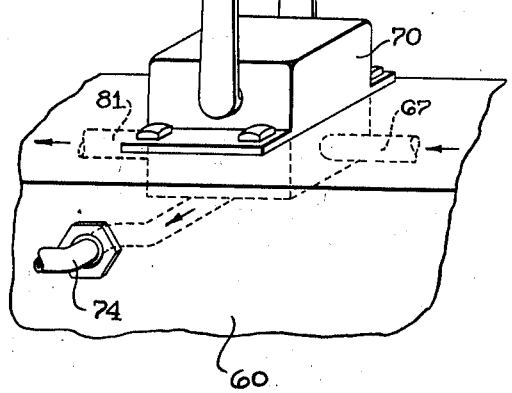

Patented Jan. 26, 1943

2,309,158

UNITED STATES PATENT OFFICE 2,309,158

AGRICULTURAL IMPLEMENT

Bert R. Benjamin, Oak Park, Ill., assignor to International Harvester Company, a corporation of New Jersey Application January 13, 1941, Serial No. 374,191

8 Claims. (Cl. 97—50)

This invention relates to agricultural implements, and more particularly to a mechanism for moving the working tools connected to a supporting frame or to a tractor.

It is an object of the invention to provide in a power arrangement, means for automatically obtaining consecutive movement of tandem arranged working tools which is of simple construction and automatically operated in its operation.

It is another object of the invention to provide a simplified means for adjusting the working depth of the working tools in a type of arrangement where bodily adjustment of the power-actuated device is effected to accomplish the adjusting of the working tool wherein the end of the adjusting lever per se serves as a support of the power-actuated device and extends from the forward portion of the tractor to a location near to the operator's station whereby the power-actuated device may be located well forward on the tractor.

According to the present invention, the working tools located respectively on the forward and rearward portion of the tractor are interconnected by three articulated links so arranged that two of the links receive movement prior to any substantial movement of the third link. When these two links are moved, as by means of a fluid-actuating device connected to the intermediate link, the forward implement will be lifted or lowered and then following a continuation of the movement of the power-actuated device, the third link will be moved, and to this third link is connected a second working tool located in tandem relationship or in rear of the first working tool. The same sequence of movement of the links is effected upon exhausting the fluid-actuated device to lower the working tools. By this arrangement of the links, automatic delayed lifting and lowering of working tools located respectively on the rearward portion of the tractor is effected. When it is desired to adjust the working depth of these working tools, the fluid-actuating device is bodily adjusted. The fluid-actuated devices are respectively located on each side of the tractor well forward thereon and supported on an adjusting lever which extends rearwardly to the operator's station.

For other objects and for a better understanding of the invention, reference may be had to the following detailed description taken in connection with the accompanying drawings, in which:

Figure 5 is a view illustrating the location of the links when the forward tool has been lowered into its working position and prior to any lowering movement of the rearward tool;

Figures 6, 7, 8, and 9 are enlarged detail views of the links and illustrating respectively their positions when both working tools are in their ground position, when only the forward tool is raised, when both forward and rearward tools are raised, and when only the forward tool is lowered;

Figure 10 is a diagrammatic view of the fluid-power system utilized for effecting the desired operation of the individual fluid-power devices; and, Figure 11 is a detail perspective view of the control elements utilized for the certain control of the respective power-actuated devices and illustrating particularly their proximity to one another whereby simultaneous operation of the same may be effected.

Figure 1:
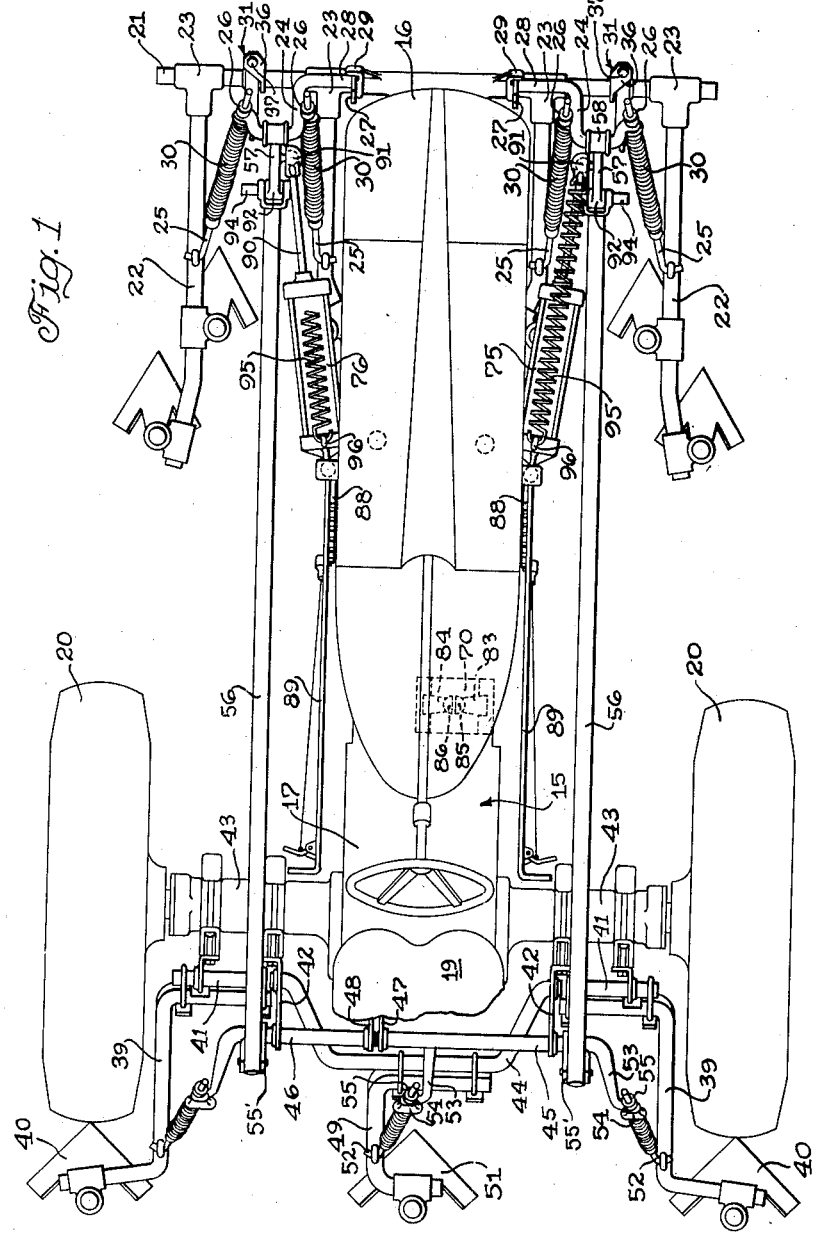
Figure 1 is a plan view of working tools respectively located on the forward and rearward portions of a tractor as well as at opposite sides thereof.
Figure 2:
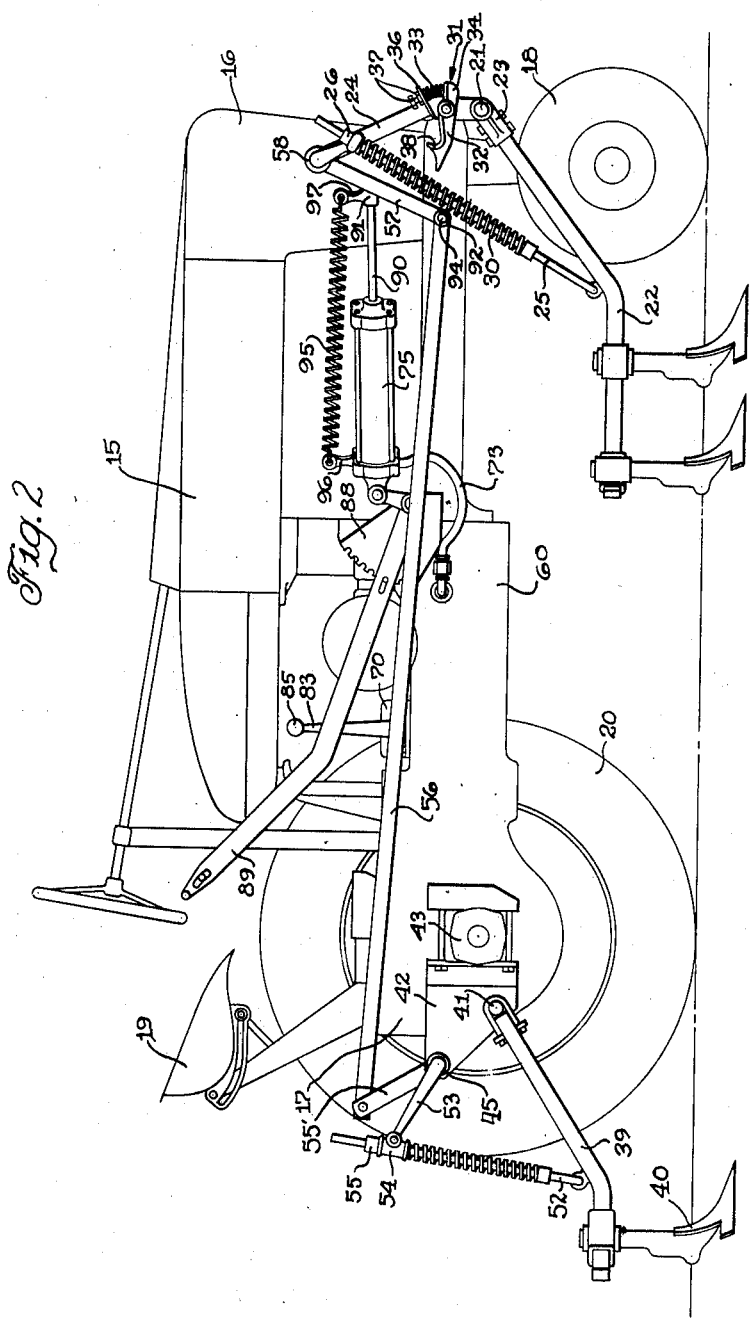
Figure 2 is a view in elevation of the tractor and illustrating particularly the connections of the individual fluid-actuating devices and the articulated links and their connection with the ground-working tools.

Referring now particularly to Figures 1 and 2, it will be seen that there is shown a tractor indicated generally at 15 having a forward portion 16, and a rearward portion 17. The forward portion 16 is supported by the forward dirigible wheels 18 adapted to be operated from an operator's station 19 on the rear portion 17 of the tractor. The rear portion of the tractor 17 is supported by rear drive wheels 20. On the forward portion 16 is mounted a transversely extending bracket structure 21 extending beyond the sides of the tractor and having pivoted thereon the working tools 22 as indicated at 23. With a cultivator arrangement such as shown in the figures, there is usually located at each side of the tractor and at the forward portion thereof a pair of such working tools or gang beams 22, the tools of each pair adapted to respectively embrace a single crop row. Pivoted on the transverse bracket structure 21 is a link 24 extending vertically and having a free end adapted to receive the upper ends of lifting rods 25. The upper ends of the lifting rods 25 pass through an opening in the upper end of the link 24 and, as the link 24 is given a forward movement, the lift rod 25 will slide through the opening in the upper end of the link 24 until it engages a collar 26, whereupon by continued movement of the link 24, the tool beam 22 will be pivoted in a crosswise direction about its pivotal connection 23 with the transverse supporting structure 21. In order to limit the forward movement of the link 24, there may be provided a flange 27 extending from the axle portion 28 on the link which will engage with a flange 29 formed rigidly on the transverse structure 21 (see Figure 1). The lifting rod 25 has a pressure spring 30 of the usual type adapted to maintain pressure upon the working tools when in their ground-working position.

The link 24 is of the inverted U-shape type and is pivoted at spaced points 28 and 31. Associated with this pivotal connection 31 there is provided a pivotal locking element 32 adapted to be rocked in a vertical plane about an axis parallel with the transversely extending bracket structure 21. This locking element 32 will normally be held in a position such as shown particularly well in Figures 2 and 6 by a spring 33 adapted to act against a forwardly extending portion 34 and adjustably arranged to react against a laterally extending flange 36 carrying an adjustable stop screw 37. The tendency of the spring is to maintain the locking beam member 32 in a clockwise rotated position. The lock element 32 has a catch portion 38.

To the rear of the portion 17 of the tractor is connected a pair of rear tool beams 39, each having working tools 40 thereon. The rear tool beams 39 are respectively pivoted at 41 to bracket structures 42 carried by the laterally extending rear axle housing 43. The means for pivoting the rear tool elements may include a laterally extending supporting member 44 which extends transversely across the rear of the tractor and is supported on these brackets 42 located respectively at each side of the tractor. Also partly supported and journaled on each of the bracket structures 42, are rockable elements 45 and 46 respectively. The inner ends of these rockable members 45 and 46 are further journaled in the journal bearings 47 and 48 carried on the rear portion 17 of the tractor.

There is also located immediately in rear of the rear portion of the tractor and centrally thereof, a third tool beam 49 pivoted to the intermediate portion of the transverse supporting bar 44 as indicated at 50. This centrally located rear tool beam 49 has a working tool 51 adapted to serve as a track sweep for loosening the dirt traversed by the dirigible wheels 18. The respective working tool elements 40 at the opposite sides of the tractor are arranged to traverse and loosen the dirt packed by the drive wheels 20.

The rockable element 45 is connected to the centrally located tool beam 49 and the tool beam 39 located at the right side of the tractor. This connection is made by means of the usual lift rods 52 connected at their lower ends to the beams 39 and 40 and at their upper ends to rearwardly extending lift arms 53 by means of the trunnion elements 54. The rods 52 extend through the trunnion elements 54 and as the rockable element 45 is rotated forwardly, the upper end of the trunnion elements will engage with a lift collar 55 to thereby cause clockwise rotation of the tool beams 39 and 49. On the left side of the tractor there is but a single tool beam 39 connected to the rockable element 46 in the manner similar to that already explained with reference to the connection of the rockable element 45 to its tool beams. It should now be apparent that the tool beams 39 on the respective sides of the tractor are arranged to be independently movable with respect to each other.

Extending upwardly from each of the rockable elements 45 and 46 is an arm 55', to the upper end of which is connected a forwardly extending link 56. This link 56 is of considerable length and there is one such link located at each side of the tractor. To the forward end of the link 56 is pivotally connected an intermediate link 57 which is connected at its upper end to the forward link 24 as indicated at 58. It should now be apparent that, when the links 56 and 57 are taken with link 24, there have been provided three articulated links.

The description now having been given as to the various working tools, and to the links interconnecting them, the following description will be to the specific power means for effecting movement of the working tools. Reference should now be had particularly to Figures 1, 2, 10, and 11. Arranged within the body portion 60 of the tractor and intermediate the forward and rearward portions thereof, there may be located in any manner desired, a fluid reservoir 61, such as indicated diagrammatically in Figure 10, a fluid pump 62 and a by-pass valve 63. The pump 62 can be of the usual gear arrangement and adapted to cause the flow of oil from the reservoir 61 through a conduit 64, to enter the inlet side 65 of the pump. The fluid upon leaving an outlet side 66 of the pump 62 will be directed through a conduit 67 to a valve control arrangement 70 adapted to house a pair of conduits 68 and 69 and the valves 71 and 72, indicated diagrammatically in Figure 10. From this valve arrangement 70 hose conduits 73 and 74 extend through the wall of the body portion 60 for connection with fluid-power actuated devices 75 and 76, respectively. These power actuated devices are of the single acting type and fluid passes to but one side of the piston of the same.

The pump 62 is arranged to be constantly driven by a constantly driven part within the body portion 60 of the tractor, which part is adapted to receive power from the tractor motor. This fluid from the outlet side 66 of the pump 62 will normally be directed through a by-pass valve 63 and return to the reservoir 61 through a conduit 77. When it is desired to provide pressure to any one of the fluid-actuated devices 75 and 76, the valve 71 or the valve 72 may be operated so as to position their respective ports 78 and 79 so that fluid directed into either of the conduits 68 or 69 will be delivered to the respective fluid-actuated devices 75 or 76. When these fluid-actuated devices have been extended to their maximum extent, the flow of fluid thereto will be shut off and fluid coming from the pump 62 will be returned to the fluid reservoir 61 through the by-pass conduit 77. Should it be desired to cause the pistons within the fluid-actuated devices 75 and 76 to be returned to their unextended positions, the same valves 71 or 72 will be operated so that their respective ports 78 and 79, instead of being in communication with the conduits 68 and 69, will be in communication with conduits 81 or 82, respectively. These conduits 81 or 82 serve to conduct the fluid from the fluid-actuated devices back to the reservoir 61.

As viewed more particularly in Figures 1 and 11, it is seen that the valves 71 and 72 may be located within a single common housing 70. Likewise, the conduits 67, 68, 69, 81, and 82 may in part be made within this same housing 70. As one of the main features of the present invention, it will be apparent that by having these valves arranged within the housing 70, the control elements or levers 83 and 84, adapted to operate respectively the valves 71 and 72, may be so shaped and fashioned and arranged in such close proximity with respect to each other that an operator could operate both of said levers by a single hand. The levers 83 and 84 may respectively have knobs 85 and 86. These knobs are of such size that one or both of the same can be grabbed by the single motion of one hand of the operator. This arrangement 70 is so positioned on the tractor as to be readily accessible to an operator located at the operator's station 19. The housing 70 is of such shape as to fit partially within the top part of the body portion 60 of the tractor as shown in Figure 11.

Referring now particularly to Figures 1 and 2, it will be noted that the fluid-power actuated devices 75 and 76 are located respectively at the sides of the tractor. Their rearward ends are supported on a quadrant mechanism 88 having a lever 89 extending rearwardly to a location proximate the operator's station 19. As this lever 89 is rotated about the quadrant, in a manner well known, the fluid-actuated device will be bodily adjusted forwardly or rearwardly as the operator may desire. Through each of the fluid-actuated devices a piston rod 90 is extended to connect with the intermediate link 57 as indicated at 91. As the control lever 83 is moved forwardly communication will be made between the conduit 68 and the conduit 73 whereby fluid will be directed to the fluid-actuated device to cause extending of its piston rod 90. During this operation the links 57 and 24 will be caused to pivot forwardly prior to any substantial movement forwardly of the link 56 which is connected at 92 to the lower end of the intermediate link 57. This is made possible by the fact that the connection 91 with the intermediate link 57 is made at a point well removed from the joint 92 between the intermediate link and the link 56. At this time the articulated links will be moved from a position shown in Figure 6 to a position shown in Figure 7 where the link 24 will assume a position more perpendicular than its position shown in Figure 6. The only movement which has been given to the link 56 is more or less in a vertical direction, whereas both the links 24 and 57 have been rotated in a clockwise direction with respect to the joint 92, into the position shown in Figure 7.

Figure 3:
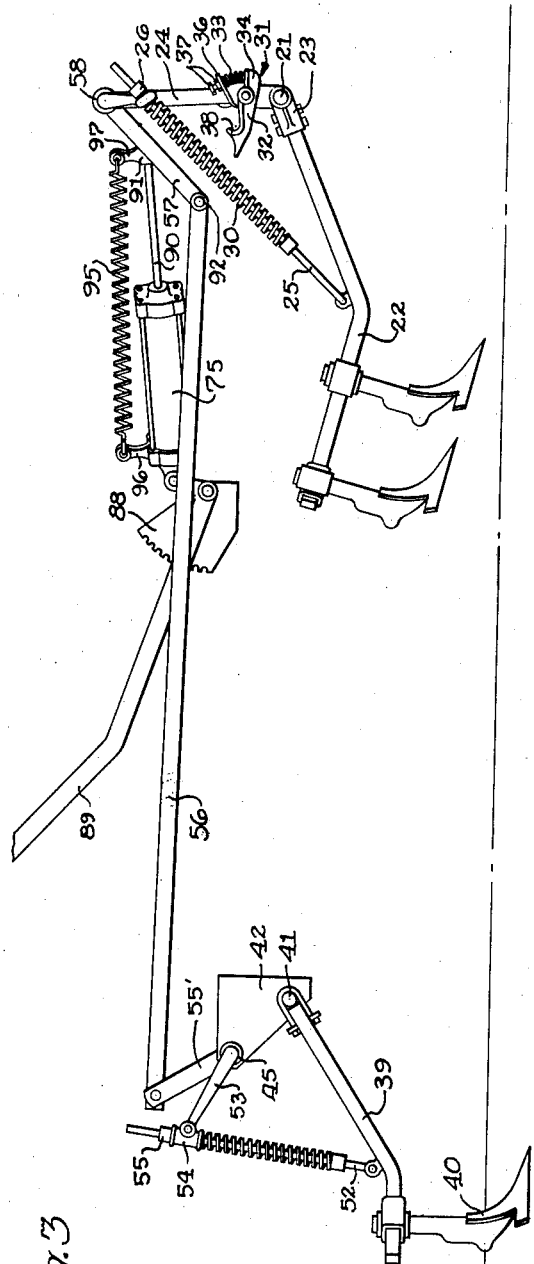
Figure 3 is a view in elevation, similar to Figure 2, of the links operated to effect lifting movement of the forward tool.
Figure 4:
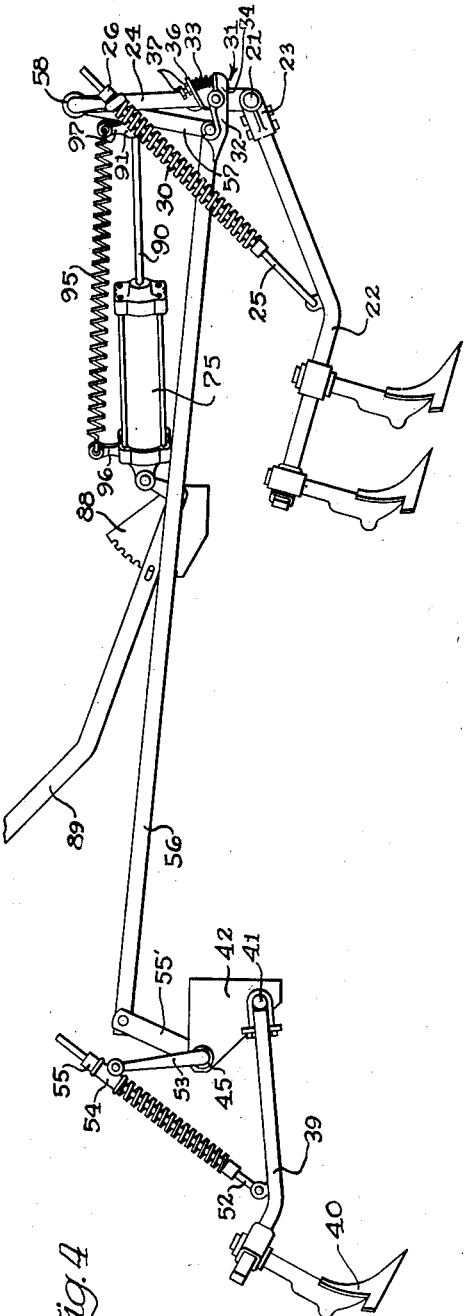
Figure 4 is a view similar to Figure 3, showing the arrangement of the links when both the forward and rearward tools have been lifted.

Figures 3 and 7, it will be noted, show that the forward tool 22 has been rotated clockwise to a raised position. This has been effected through the lift rods in a manner heretofore described. This forward movement of the link 24 has been resisted by engagement of the flange 27 with the stop 29. When this position has been arrived at, the next movement of the links will be to assume the position shown in Figures 4 and 8. The intermediate link 57 will pivot about its connection with the upper end of the link 24 and will take with it the link 56 until a laterally extended portion 94 will engage with the catch portion 38 of the locking means 32. The links will then take the position as shown in Figures 4 and 8, and it will be noted that both the forward and rearward tools will then have been raised.

It should now be apparent that by this arrangement of the links an automatic delayed operation of the rear tool has been effected. The forward and rearward tools will be moved in consecutive order to the raised position. The advantage of this delaying operation is well known. By having this delayed operation of the rear tool, the crop rows may be fully cultivated throughout the end of the field by the rear tool.

When it is desired to lower the working tools, this delayed action of operation of the rear tool may again be effected in a manner now to be described. The lever 83 will then be moved from its neutral position rearwardly so as to position the port 78 between the conduits 73 and 81 whereby fluid in the fluid-actuated device 75 may be returned to the reservoir 61. As this is effected, due to the action of a spring 95 and to the weight of the working tools, the tool links 24 and 57 will at first be given a counter-clockwise movement, the lower end of the link 57 and the link 56 being retained by the locking element 32. This is illustrated particularly well in Figures 5 and 9. These links have been rotated counter-clockwise a sufficient distance to permit the forward working tools to go into their ground-working positions, downward force will be applied to aid counter-clockwise movement of the locking element about its pivot point and against the action of the spring 33. The projection 94 engaging with the locking portion 38 of the lock element 32 will finally release from its engagement with the lock element 32 when this lock element has rotated sufficiently over center and such that the weight of the rear tool is sufficient to release the element 94 from its locking engagement with the locking element 32. As the portion 94 disengages the rear tool, the tool will fall into its ground-working position. The locking element 32 will have served to delay the lowering of the rear tool during the lowering operation of the working tools. It should now be apparent that not only has there been provided delayed lifting of the rear tool but also there is provided automatic delayed lowering of the rear tool with respect to the forward tool. The spring 95 may take any of a number of forms but it will be sufficient for illustration to show that the spring is connected to a portion 96 formed integral with the power-fluid actuated device 75 and a vertically extending portion 97 connected to the element 91.

While there has been described the operation of working tools located at one side of the tractor, it will be apparent that a similar arrangement is had for the operation of the tools at the opposite side of the tractor. The tools at the opposite side of the tractor may be caused to move by a similar movement of the control lever 84. There are many occasions when it is desired to have only the working tools at one side of a cultivator operating at one time. That is particularly true when cultivators of this type are being used for cultivation of crop rows located on terraces or where rows join the field at an angle, the crop row forming a point with the edge of the field. Also, each of the implements at each side may be readily adjusted by the adjusting mechanism 88 for control of their working depth in the soil. As the lever 89 is rotated in a clockwise direction, the fluid-actuated device 75 will be moved bodily forwardly and a decrease in the depth of operation of the working tools will be made. In the reverse manner, a rotation of the adjusting lever 89 in a counter-clockwise direction will increase the working depth of the tools.

In the cultivating of smooth fields, where there are no terraces and where the crop rows come to the end of the field at an angle of 90 degrees, it will be apparent that there would be no desire to operate one of the levers 83 or 84 independently of the other. By the present arrangement of the control handles 83 and 84, it will be seen that by a single hand of the operator both the knobs 85 and 86 may be grabbed at one time and at no greater effort than when the operator might be grabbing but a single knob 85 or 86. Both of the control levers 83 and 84 would then be moved forwardly and automatically a raising of the forward gangs on both sides of the tractor would be effected at a time together and the raising of the working tools on the rear of the tractor would also be raised together but delayed in their operation by the respective articulated link arrangements until the tractor has reached the end of the field.

While various changes can be made in the detail construction of this arrangement, it shall be understood that such changes shall be made within the spirit and scope of the present invention as defined by the appended claims.

What is claimed is:

1. In combination, a tool-supporting frame, a pair of working tools located in tandem relationship one with respect to the other, each of said tools being connected to the frame for independent movement, means for moving the tools in consecutive order including three articulated links extending longitudinally of the supporting frame and adapted to pivot about transverse axes, said three articulated links being so arranged that movement of two of the links may be had prior to any substantial movement of the third link, means for connecting one of the tools to one of the two links, and means for connecting the other of said tools to the third link.

2. In combination, a tool-supporting frame, a pair of working tools located in tandem relationship one with respect to the other, each of said tools being connected to the frame for independent movement, means for moving the tools in consecutive order including three articulated links extending longitudinally of the tool-supporting frame and adapted to pivot about a transverse axis, single acting power means connected to the intermediate link, the said link being further so dimensioned and arranged as to at first cause movement of the intermediate link and one other link prior to any substantial movement of the third link and for subsequently moving the third link, means for locking the third link in its moved position while permitting partial return movement of the two links upon release of the power means, said lock means being so arranged as to unlock automatically after the intermediate link and the other link has been partially returned and upon release of the power means, means for connecting the rearward tool to the third link, whereby automatic delaying action of the rearward tool upon movement of the tools in either direction will be effected.

3. In combination, a tractor having forward and rearward portions, ground-working tools mounted respectively on the forward and rearward portions of the tractor for vertical movement to and from their ground-working positions, means for moving the tools in consecutive order both to and from their ground-working positions including three articulated links so arranged that movement of two of the links is prior to any substantial movement of the third link, means for connecting the tool on the forward portion to one of the links, and means for connecting the tool on the rearward portion to the third link.

4. In combination, a tractor having forward and rearward portions, ground-working tools mounted respectively on the forward and rearward portions of the tractor for vertical movement to and from their ground-working positions, means for moving the tools in consecutive order including three articulated links, a single acting power device connected to the intermediate link so as to first cause movement of that link and one other link prior to any substantial movement of the third link, and then to move the third link, means for locking the third link in its moved position while permitting partial return movement of the two links upon release of the power device, said lock means being so arranged as to unlock automatically upon release of the power device and after the intermediate link and the other link have been partially returned, means for connecting the tool on the forward portion to the said other link, and means for connecting the tool on the rearward portion to the said third link.

5. In combination, a tractor having forward and rearward portions, ground-working tools mounted respectively on the forward and rearward portions of the tractor for vertical movement to and from their ground-working positions, means for moving the tools in consecutive order including three articulated links, a single acting power device connected to the intermediate link so as to first cause movement of that link and one other link prior to any substantial movement of the third link, and then to move the third link, means for locking the third link in its moved position while permitting partial return movement of the two links upon release of the power device, said lock means being so arranged as to unlock automatically upon release of the power device and after the intermediate link and the other link have been partially returned, means for connecting the tool on the forward portion to the said other link, means for connecting the tool on the rearward portion to the said third link, and means for bodily adjusting the single acting device and the intermediate link for depth adjustment of the working tools.

6. In combination, a longitudinally extending tool-supporting frame, a pair of working tools located at each side of the tool-supporting frame, the respective tools of each pair being respectively connected to the tractor in substantially tandem relationship and for movement in respect thereto, power mechanism for moving the working tools including a single power-actuated device for moving respectively the working tools at the respective sides of the frame, means for connecting the working tools at the respective sides of the tractor to each power-actuated device so that automatic delayed operation of the rearward working tool will be effected, a manual control element for each power-actuated device whereby independent operation of the working tools at the respective sides of the frame may be obtained, and said control elements being arranged in such close proximity that both elements may be simultaneously operated by a single hand of the operator to thereby effect movement of the working tools on both sides of the frame.

7. In combination, a tractor having forward and rearward portions, a pair of ground-working tools located at each side of the tractor, the working tools at each side being connected respectively to the forward and rearward portions of the tractor for vertical movement to and from their ground-working positions, power mechanism for moving the working tools including a single power-actuated device for moving respectively each pair of the working tools, means for connecting the working tools at the respective sides of the tractor to their power-actuated device so as to effect consecutive movement respectively of the forwardly and rearwardly connected tools, a manual control element for each power-actuated device whereby independent operation of the working tools at the respective sides of the tractor may be obtained, and said manual control elements being arranged on the tractor in such close proximity that both elements may be simultaneously operated by a single hand of the operator when desired, whereby all the tools in the forward portion of the tractor may be moved prior to movement of all the tools on the rearward portion of the tractor.

8. In combination, a tractor having forward and rearward portions, an operator's station on the tractor, a pair of working tools located at each side of the tractor, the working tools at each side of the tractor being connected respectively to the forward and rearward portions of the tractor for movement with respect thereto, power mechanism for moving the working tools including fluid-actuated devices for moving respectively each pair of working tools, means for connecting each pair of working tools to their fluid-actuated device so as to effect consecutive movement respectively of forwardly and rearwardly connected tools, a fluid control valve mechanism carried on the tractor near to the operator's station and including a pair of manual control elements, one for each fluid-actuated device, whereby independent operation of the working tools at the respective sides of the tractor may be obtained and the respective manual control elements being arranged on said mechanism in such close proximity that both elements may be simultaneously operated by a single hand of the operator when desired, whereby all of the tools on the forward portion of the tractor may be moved prior to movement of all the tools on the rearward portion of the tractor.

BERT R. BENJAMIN.